United States Patent [19]

Ahmed et al.

[11] Patent Number: 4,787,715
[45] Date of Patent: Nov. 29, 1988

[54] FUEL ASSEMBLY GRID INSPECTION APPARATUS

[75] Inventors: Hassan J. Ahmed; Michael J. Field, both of Columbia, S.C.

[73] Assignee: Westinghouse Electric Corp., Pittsburgh, Pa.

[21] Appl. No.: 64,980

[22] Filed: Jun. 22, 1987

[51] Int. Cl.$^4$ .................. G21C 17/00; G21C 21/00
[52] U.S. Cl. .................. 356/244; 376/248; 376/258; 364/560; 358/101; 358/107
[58] Field of Search .......... 376/248, 258, 260, 261; 364/559–564, 170; 356/244, 394; 358/101, 106, 107; 382/8; 33/502; 269/328

[56] References Cited

U.S. PATENT DOCUMENTS

| | | | |
|---|---|---|---|
| 3,633,011 | 1/1973 | Bederman | 235/151.11 |
| 3,867,616 | 2/1975 | Korelitz et al. | 235/151.1 |
| 3,927,948 | 12/1975 | Cox et al. | 356/167 |
| 4,007,544 | 2/1977 | Kirby et al. | 33/174 R |
| 4,048,009 | 9/1977 | Weilbacher | 33/502 |
| 4,172,524 | 10/1979 | Holm et al. | 358/81 |
| 4,173,788 | 11/1979 | Laliotis | 364/560 |
| 4,271,477 | 6/1981 | Williams | 364/563 |
| 4,296,474 | 10/1981 | Hurt | 364/560 |
| 4,393,410 | 7/1983 | Ridge et al. | 358/285 |
| 4,464,332 | 8/1984 | Boisseuil et al. | 376/215 |
| 4,519,593 | 5/1985 | Kobuck et al. | 376/261 |
| 4,598,420 | 7/1986 | Harvey | 382/8 |
| 4,657,728 | 4/1987 | Coppa et al. | 376/248 |
| 4,677,578 | 6/1987 | Wright et al. | 364/562 |
| 4,692,800 | 9/1987 | Yoshida | 358/101 |
| 4,697,245 | 9/1987 | Kara et al. | 358/101 |
| 4,711,579 | 12/1987 | Wilkinson | 356/394 |
| 4,713,212 | 12/1987 | Plumier | 376/258 |
| 4,728,483 | 3/1988 | Ahmed et al. | 376/258 |

FOREIGN PATENT DOCUMENTS

| | | |
|---|---|---|
| 134315 | 3/1985 | European Pat. Off. . |
| 2604720 | of 1976 | Fed. Rep. of Germany . |
| 0039655 | 3/1979 | Japan . |
| 0075192 | 4/1984 | Japan . |

OTHER PUBLICATIONS

Publication entitled "Television Techniques for Reactor Inspection", No. 253, 3 pages, Sep. 1975, by CEGB Technical Disclosure Bulletin.

Primary Examiner—Deborah L. Kyle
Assistant Examiner—Daniel Wasil

[57] ABSTRACT

A fuel assembly grid inspection apparatus includes a precision noncontact measurement device having a source of illumination and a viewing system which define an inspection field of view. The viewing system is adapted to view and record one or more images of an object, such as a fuel assembly grid, located in the field of view to provide information from actual measurements of the grid which can be calculated to determine whether or not it comes within acceptable tolerances of the measurements of a standard grid of the same design. The apparatus also includes a universal fixture adapted to support any one of a variety of grids of different designs within the field of view such that portions of the fixture within the field of view are substantially transparent to the viewing system. The viewing system and the fixture are movable relative to each other in X, Y and Z directions for achieving a complete inspection of all parts of the grid. Typically, the grid being inspected has at least a pair of vertically displaced fuel rod contacting dimples disposed in each of a plurality of cells defined in the grid. The dimples are inspected for perpendicularity with respect to each other by using the viewing system to view them at separate instances but from the same location within the field of view.

14 Claims, 7 Drawing Sheets

FUEL ASSEMBLY GRID INSPECTION APPARATUS

CROSS REFERENCE TO RELATED APPLICATION

Reference is hereby made to the following copending application dealing with related subject matter and assigned to the assignee of the present invention: "Apparatus for Integrated Fuel Assembly Inspection System" by Hassan J. Ahmed et al, assigned U.S. Ser. No. 855,266 and filed Apr. 24, 1986 (W.E. 52,878), now U.S. Pat. No. 4,728,483.

BACKGROUND OF THE INVENTION

1. Field of the Invention

The present invention relates generally to fuel assemblies for nuclear reactors and, more particularly, is concerned with an apparatus and method for inspecting the dimensional characteristics of fuel assembly grids.

2. Description of the Prior Art

In most nuclear reactors, the reactor core is comprised of a large number of elongated fuel assemblies. Conventional designs of these fuel assemblies include a multiplicity of fuel rods held in an organized array by a plurality of grids spaced axially along the fuel assembly length and attached to a plurality of control rod guide thimbles of the fuel assembly. Top and bottom nozzles on opposite ends of the fuel assembly are secured to the guide thimbles which extend slightly above and below the opposite ends of the fuel rods.

The grids as well known in the art are used to precisely maintain the spacing between the fuel rods in the reactor core, prevent rod vibration, provide lateral support for the fuel rods, and, to some extent, frictionally retain the rods against longitudinal movement. Conventional designs of grids include a multiplicity of interleaved inner straps having an egg-crate configuration designed to form cells which individually accept the fuel rods and control rod guide thimbles. The cells of each grid which accept and support the fuel rods at a given axial location therealong typically use relatively resilient springs and relatively rigid protrusions (called dimples) formed into the metal of the interleaved straps. The springs and dimples of each grid cell frictionally engage or contact the respective fuel rod extending through the cell. Additionally, outer straps are attached together and peripherally enclose the inner straps to impart strength and rigidity to the grid. The outer straps conventionally have springs integrally formed into the metal thereof which project into respective ones of the cells disposed along the perimeter of the grid.

The manufacture of a fuel assembly grid is an intricate operation, requiring not only the assembling of the straps in interleaved fashion to form the grid but also their retention together in precise positions relative to one another during subsequent welding thereof. The newly-manufactured grid must meet high standards in terms of its cell size (that is, the distance between opposite springs and dimples within each cell), envelope, squareness and dimple perpendicularity for it to be able to properly perform its function in the fuel assembly. Thus, the grid must be meticulously inspected to ensure that such standards are met. Heretofore, grid inspection has required the performance of a series of time-consuming, essentially manual, procedures.

Grid inspection, as practiced heretofore, has constituted an impediment to improvement of overall productivity of fuel assembly manufacture. Consequently, a need has emerged to improve and automate the way in which fuel assesmbly grid inspection is performed.

SUMMARY OF THE INVENTION

The present invention provides a fuel assembly grid inspection apparatus and method designed to satisfy the aforementioned needs. In contrast to the previous manual procedures, the apparatus and method of the present invention employ a precision measurement device in conjunction with an automated universal grid fixture. The measurement device measures the grid by viewing it, rather than by contacting or touching it as in the case of one prior art measurement machine disclosed in U.S. Pat. No. 4,007,544 to Kirby et al, being assigned to the assignee of the present invention.

The measurement device and the automated universal grid fixture of the present invention together, under software control, can accomplish inspection of the dimensional characteristics of a wide variety of fuel assembly grid designs in terms of dimple perpendicularity in X-Y directions, cell size in X-Y directions, vane position, squareness and envelope. Specialized application software is utilized wherein there is an individual program for each different grid design inspected.

Accordingly, the present invention is directed to a fuel assembly grid inspection apparatus, comprising the combination of: (a) a precision noncontact measurement device having illuminating means and viewing means defining an inspection field of view, the viewing means being adapted to view and record an image of the fuel assembly grid located in the field of view to provide information about the grid from which measurements can be calculated, and (b) a fixture adapted to support the grid within the inspection field of view such that portions of the fixture which project into the field of view to support the grid are substantially transparent to the viewing means of the measurement device.

More particularly, the measurement device of the apparatus includes a stationary base and an inspection platform movable in the Y direction with respect to the stationary base. The viewing means of the device is disposed in spaced relation above the inspection platform and movable in X and Z directions with respect to the stationary base. The fixture of the apparatus includes a mounting base having first and second pairs of opposing portions bounding the perimeter of the inspection field of view. The mounting base is supported by the inspection platform of the measurement device and movable therewith. Also, the fixture includes first and second pairs of upright grid supports, and guide means mounted along the opposing mounting base portions of the first pair thereof. Each of the pairs of grid supports is mounted to the guide means in spaced relation to one another for adjustable slidable movement therealong. Each of the grid supports has thereon one of the substantially transparent grid engaging portions which project into the field of view to support the grid.

Still further, the fixture includes a pair of extendable and retractable actuators. One actuator is mounted on one of the opposing mounting base portions of the first pair thereof and the other is mounted on one of the opposing mounting base portions of the second pair thereof. The actuators are actuatable to locate the grid in a desired position with respect to the inspection field of view by causing movement of the grid in X and Y directions. Also, a plurality of sensors are provided on the fixture. One sensor is mounted on the other of the opposing mounting base portions of the first pair thereof and the other being mounted on the other of the opposing mounting base portions of the second pair thereof. The sensors are responsive to contact by the grid when the latter has been moved to its desired position with respect to the inspection field of view.

Also, the present invention is directed to a fuel assembly grid inspection method, comprising the steps of: (a) defining an illuminated inspection field of view; (b) supporting in unobstructed relationship within the field of view a fuel assembly grid of a design having known standard measurements by using a fixture whose portions which project into the field of view to support the grid therein are substantially transparent to the field of view; (c) viewing the grid within the field of view; and (d) recording an image thereof to provide information about the grid from which actual measurements can be calculated and compared to the known standard measurements for the particular grid design. More particularly, the supporting step includes providing a fixture universally adapted for supporting within the inspection field of view any one of a plurality of fuel assembly grids of different designs having different known standard measurements. Additionally, the viewing step includes maintaining a video camera and lens system pointed toward the field of view and the grid supported therein, and moving at least one of the grid and the video camera and lens system relative to the other for viewing the grid.

Still further, the present invention is directed to a fuel assembly grid inspection method, comprising in combination the steps of: (a) defining an illuminated inspection field of view; (b) supporting within the field of view a fuel assembly grid having at least a pair of fuel rod contacting dimples disposed in each cell of a plurality thereof defined in the grid which are adapted to receive fuel rods therethrough; (c) inspecting the pair of dimples for perpendicularity with respect to one another by viewing the dimples at separate instances from the same location within the field of view; and (d) recording a separate image of each dimple to provide information from which actual measurements of any offset in X and Y directions of one dimple with the other can be calculated.

Yet further, the present invention is directed to a fuel assembly grid inspection method, comprising in combination the steps of: (a) defining an illuminated inspection field of view; (b) positioning a fuel assembly grid support fixture about the perimeter of the field of view such that portions of the fixture which project into the field of view to support a grid therein are substantially transparent to the field of view; (c) supporting on the fixture within the field of view a fuel assembly grid of a design having known standard measurements; (d) sensing the position of the fixture for providing information to determine the correctness thereof before proceeding with inspection of the grid; and (e) inspecting the grid within the field of view.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
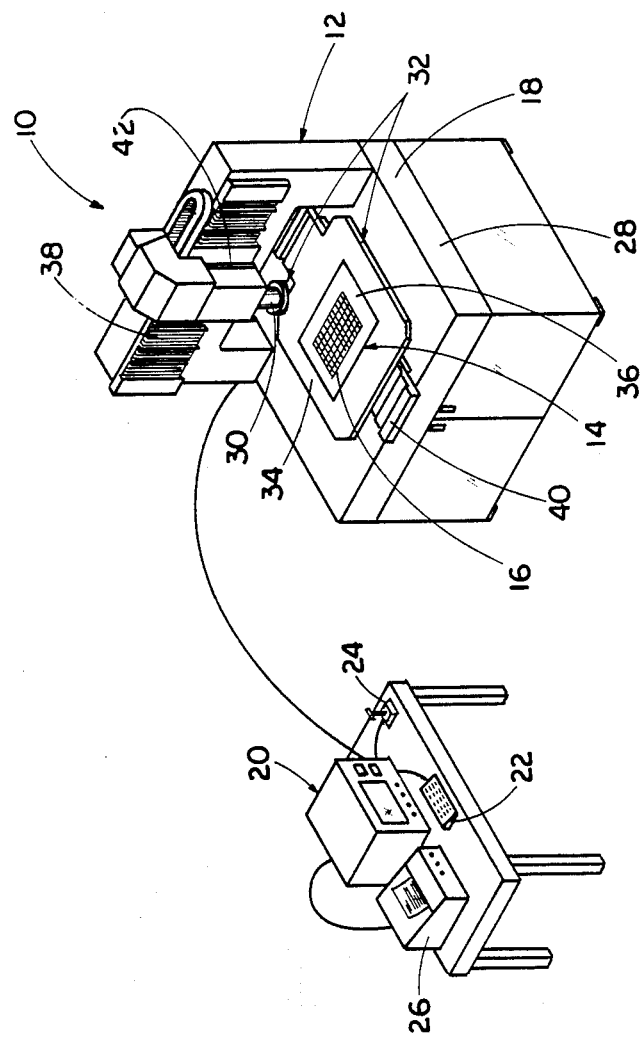
FIG. 1 is a perspective view of the fuel assembly grid inspection apparatus which includes the combination of the precision measurement device and the fuel assembly grid support fixture comprising the present invention.
Figure 2:
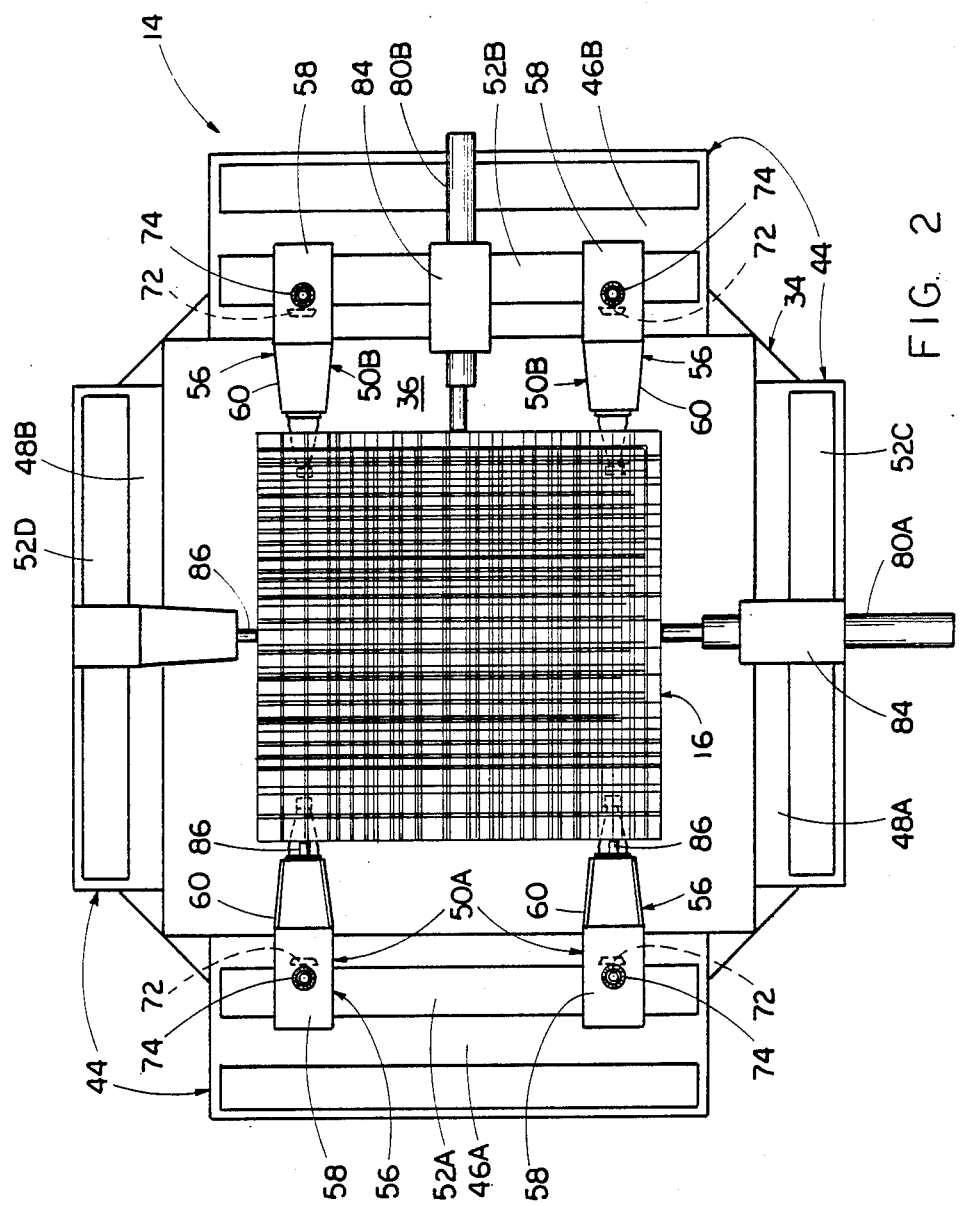
FIG. 2 is an enlarged top plan view of the grid support fixture being mounted on a base of the measurement device of the apparatus of FIG. 1, showing a grid being supported by the fixture.
Figure 3:
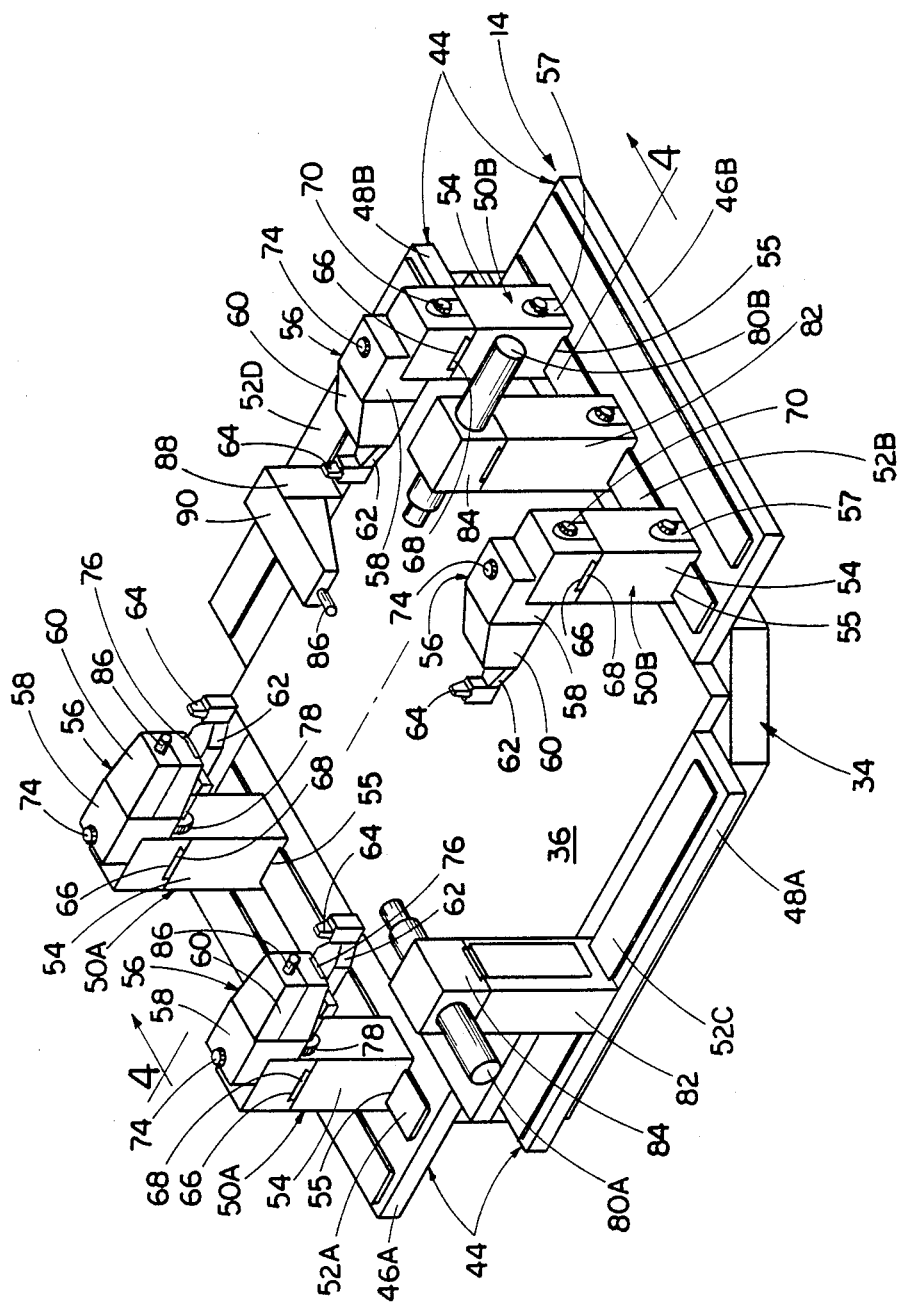
FIG. 3 is a perspective of the measurement device base and the grid support fixture of FIG. 2, with the grid being omitted.
Figure 4:
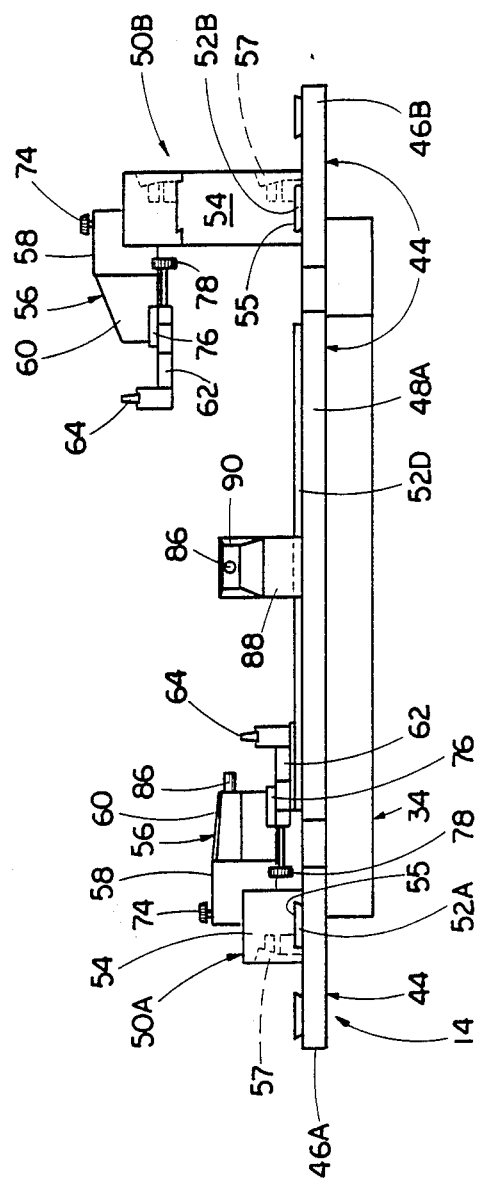
FIG. 4 is an elevational view, partly in section, of the measurement device base and the grid support fixture as seen along line 4—4 of FIG. 3.
Figure 5:
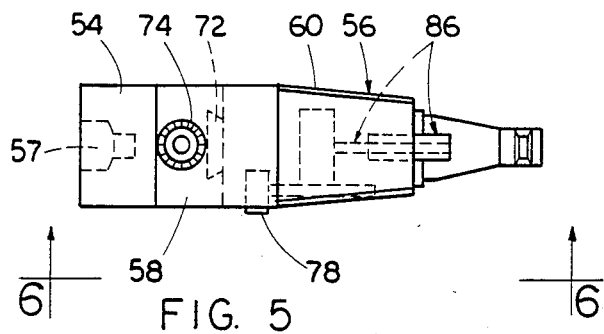
FIG. 5 is an enlarged top plan view of one of the grid support assemblies of the grid support fixture of FIGS. 2–4.
Figure 10:
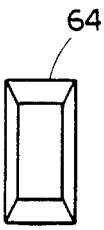
FIG. 10 is an enlarged top plan view of one of the synthetic sapphire grid support inserts on each of the grid support assemblies of FIGS. 5 and 6.
Figure 6:
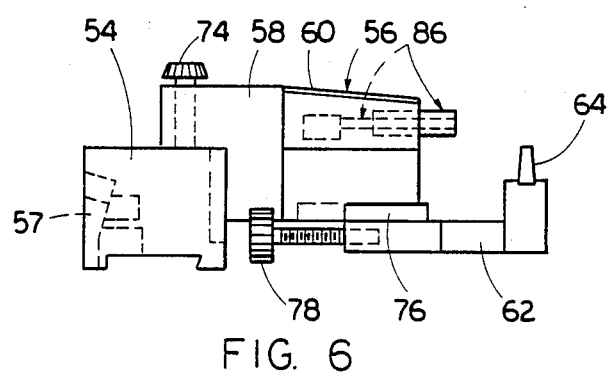
FIG. 6 is a side elevational view of the grid support assemblies as seen along line 6—6 of FIG. 5.
Figure 11:
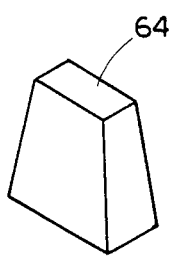
FIG. 11 is a perspective view of the synthetic sapphire grid support insert of FIG. 10.
Figure 7:
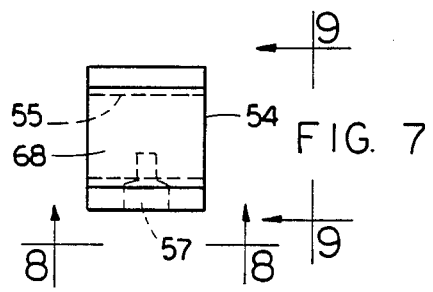
FIG. 7 is an enlarged top plan view of one of the spacer blocks which is shown in FIGS. 3 and 4 mounting each of the grid support assemblies on slide tracks of the grid support fixture.
Figures 8, 9:
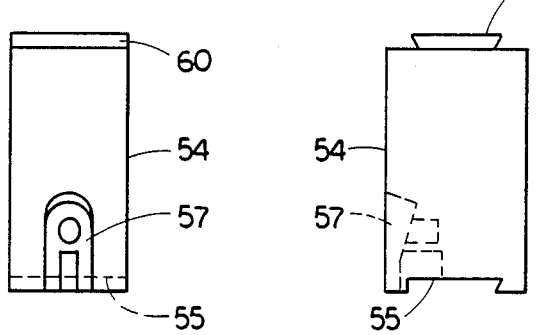
FIG. 8 is a rear elevational view of the spacer block as seen along 8—8 of FIG. 7.
FIG. 9 is a side elevational view of the spacer block as seen along line 9—9 of FIG. 7.
Figure 12:
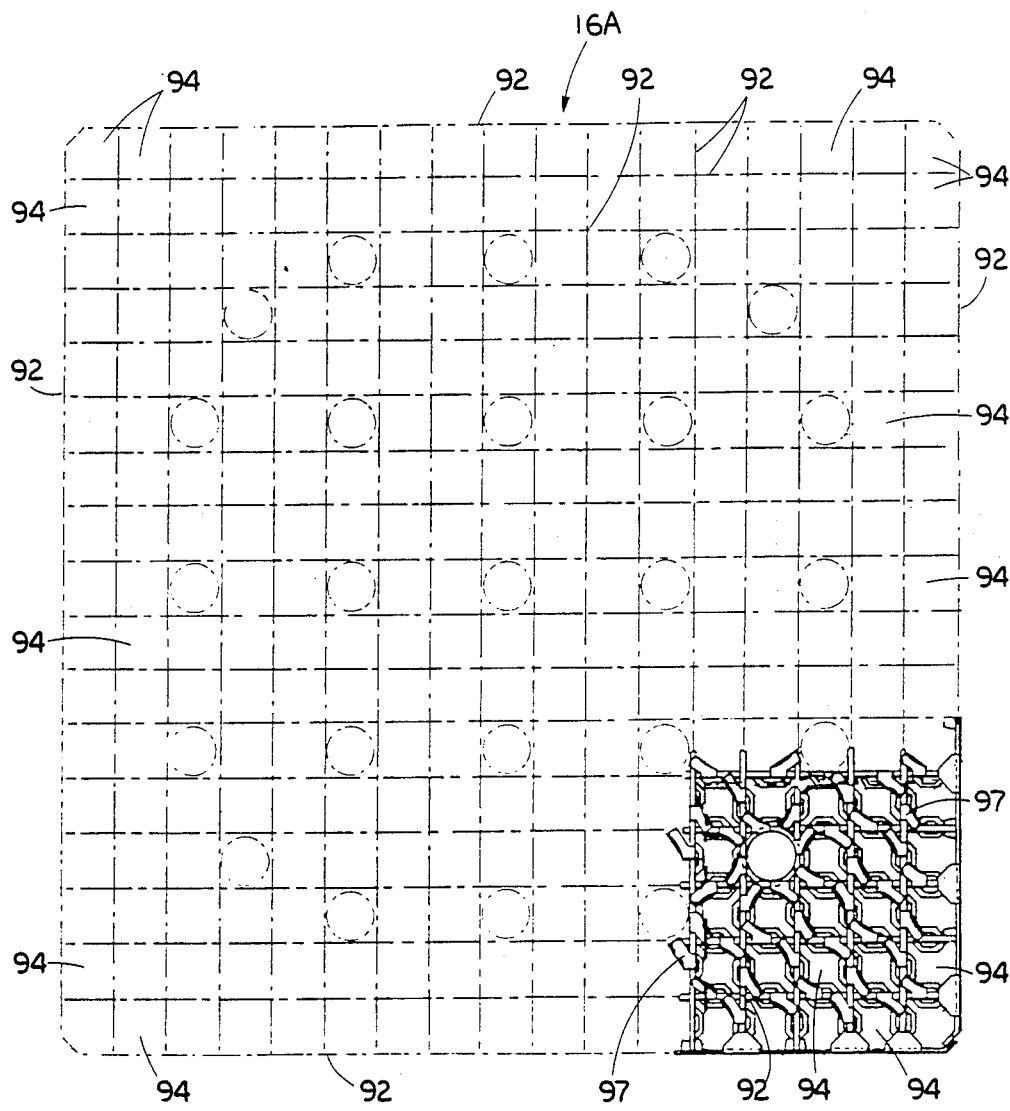
FIGS. 12 and 13 are top plan and foreshortened side elevational views, respectively, of one design of a fuel assembly grid which can be inspected by the apparatus of FIG. 1, wherein the grid has mixing vanes projecting from its upper side and fuel rod contacting dimples, but no springs, projecting into the cells of the grid.
Figure 13:
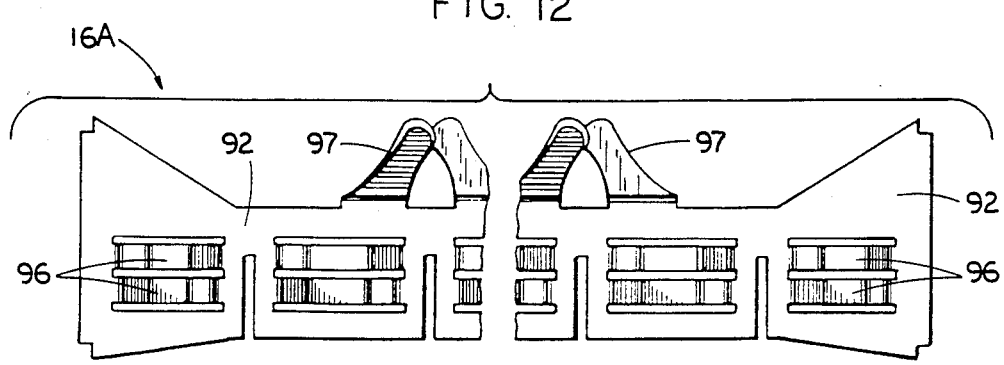
Figure 14:
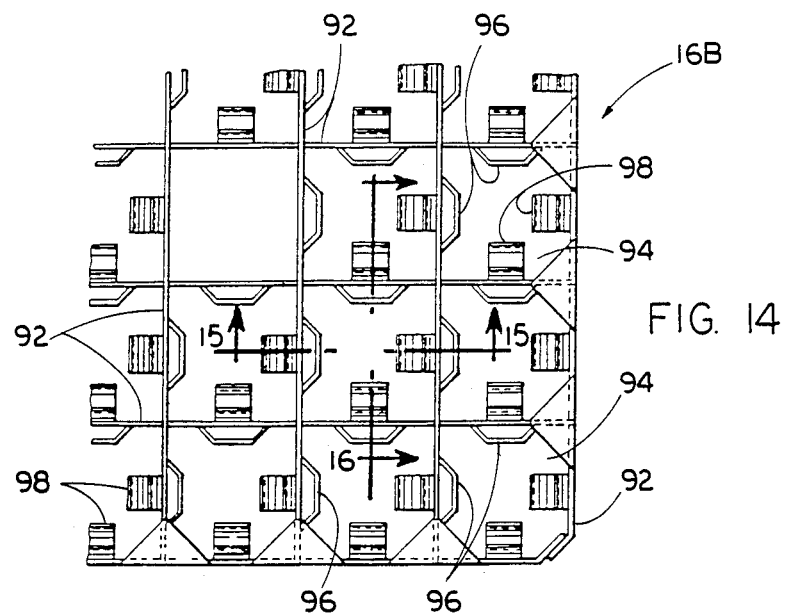
FIG. 14 is a fragmentary top plan view of another design of a fuel assembly grid which can be inspected by the apparatus of FIG. 1, wherein the grid has fuel rod contacting dimples and springs projecting into the cells of the grid.
Figures 15, 16:
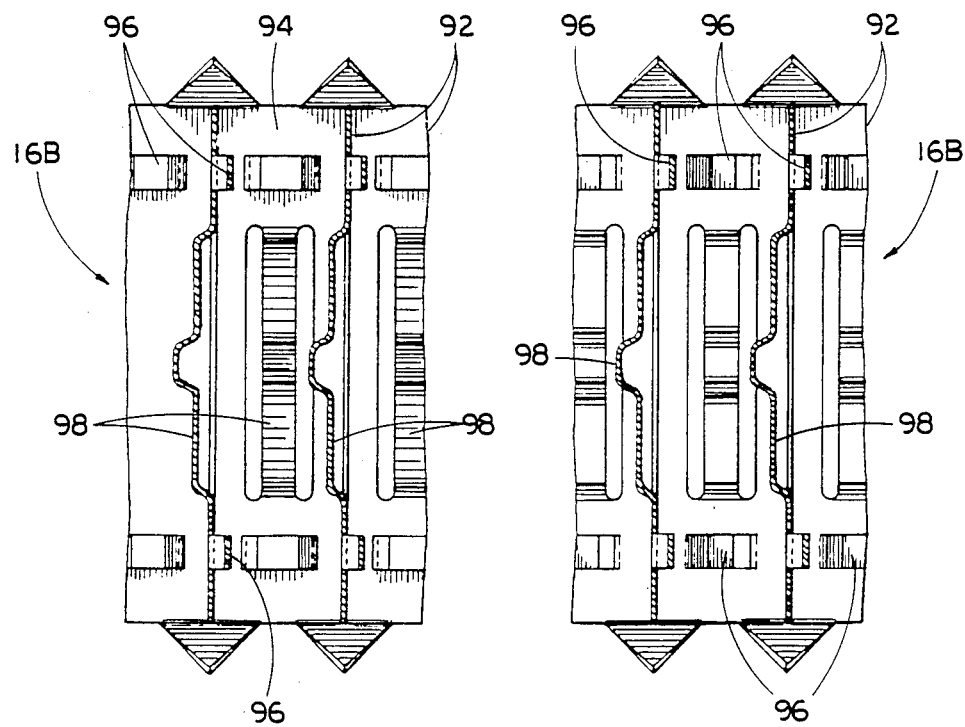
FIG. 15 is a fragmentary elevational view, partly in section, of the grid as seen along line 15—15 of FIG. 14.
FIG. 16 is another fragmentary elevational view, partly in section, of the grid as seen along line 16—16 of FIG. 14.

In the following description, like reference characters designate like or corresponding parts throughout the several views of the drawings. Also in the following description, it is to be understood that such terms as "forward", "rearward", "left", "right", "upwardly", "downwardly", and the like, are words of convenience and are not to be construed as limiting terms.

Referring now to the drawings, and particularly to FIG. 1, there is shown a fuel assembly grid inspection apparatus, generally designated by the numeral 10, which includes the combination of a precision noncontact measurement device, generally designated 12, and a universal support fixture 14 which are the components of the apparatus 10 comprising the present invention which cooperate in inspecting a fuel assembly grid 16. As seen in FIG. 1, the precision measurement device 12 per se is in the form of hardware manufactured and sold by View Engineering of Simi, Calif. and identified by the model designation "View 1220 System". The device 12 basically includes a data gathering unit (DGU) 18, a monitor and disk drive assembly (MDDA) 20, a keyboard 22, a joystick 24 and a printer 26. The device 12 measures by viewing or seeing, instead of touching or contacting, the grid 16.

The DGU 18 of the device 12 includes a stationary base 28, viewing means 30 in the form of a video camera and lens system, a source of illumination 32 in the form of a ring light, an inspection platform 34 having a retroreflective surface 36 thereon (which is also part of the source of illumination 32), and electromagnetically-actuated X-, Y- and Z-axes stage assemblies 38,40,42 which mount the platform 34 and viewing means 30 on the stationary base 28 for movement relative thereto and to one another along X,Y,Z orthogonal directions. The viewing means 30 is disposed above the retroreflective surface 36 on the inspection platform 34 so as to define an inspection field of view extending generally vertically therebetween. As will be described in greater detail later, the universal fixture 14 is supported by the inspection platform 34 about the perimeter of the inspection field of view. The fixture 14, in turn, supports the grid 16 across and within the field of view.

The viewing means 30 and the universal fixture 14 are movable relative to each other in X, Y and Z directions for achieving a complete inspection of all parts of the grid 16 in the vertical field of view. In particular, the Y-axis stage assembly 40 is actuatable for moving the platform 34 in the Y direction (forward or rearward, or toward the front or rear of the DGU 18) relative to the stationary base 28. The viewing means 30 being disposed in spaced relation above the inspection platform 34 is movable in X (left or right) and Z (up or down) directions with respect thereto and to the universal fixture 14 and grid 16 by actuation of the respective X-axis stage assembly 38 and the Z-axis stage assembly 42 which is movably mounted on the X-axis stage assembly 38.

The viewing means 30 is adapted to view and record one or more images of the grid 16 located in the field of view and to provide digitized video image information to the MDDA 20 from which actual measurements of the grid 16 being inspected can be calculated. The known standard measurements for the particular grid design being inspected are inputted from either a floppy disk or a permanent hard disk into the MDDA 20 and the actual measurements which have been calculated therein are compared to such known standard measurements to determined whether or not the actual dimensions of the grid 16 being inspected come within acceptable tolerances of the known standard measurements. The fixture 14 is universal in the sense that it is adapted to support any one of a variety of grids of different designs within the field of view. Different programs are stored which contain the known standard measurements of the different grid designs. The one program which corresponds to the grid being inspected will be recalled and loaded into the working memory of the MDDA 20.

It is not believed to be necessary for an understanding of the present invention that the operation of the device 12 be described in any greater detail. For more information about the operation of the device 12, one can consult the operator's manual for the View 1220 System available from View Engineering.

Turning now to FIGS. 2-11, there is shown the universal grid support fixture 14 in assembled form and in some of its individual component parts. As mentioned above, the universal fixture 14 is adapted to support any one of a plurality of fuel assembly grids of different designs within the inspection field of view of the non-contact measurement device 12. The universal fixture 14 includes a mounting base 44 having first and second pairs of opposing portions 46A,46B and 48A,48B bounding the perimeter of the retroreflective surface 36 of the inspection field of view. The portions 46A,46B and 48A,48B of the mounting base 44 are supported by the inspection platform 34 of the measurement device 12.

The universal fixture 14 further includes first and second pairs of upright grid supports 50A,50B, and guide means in the form of a pair of tracks 52A,52B mounted on, and in parallel relation along, the opposing mounting base portions 46A,46B of the first pair thereof. Each of the grid supports 50A,50B is composed of a spacer block 54 and a support assembly 56. The tracks 52A,52B have dovetail cross-sectional configurations which are complementary to and receivable in grooves 55 having dovetail cross-sectional configurations formed across the bottom of the spacer blocks 54. In such manner, the grid supports 50A and 50B of each of the pairs thereof are mounted to the respective tracks 52A and 52B in spaced relation to one another for adjustable slidable movement therealong. A clamp section 57 in each spacer block 54 is tightened to secure the spacer block to the respective one of the tracks 52A,52B.

The support assembly 56 of each of the grid supports 50A,50B is assembled from a base block 58, mounting block 60, a grid support member 62 and a grid support insert 64. The base block 58 has a groove 66 formed across its bottom which is dovetail-shaped and complementary in cross-section to a track 68 formed across the top of each spacer block 54 for mounting the base block 58 to the top of the spacer block 54. A clamp section 70 in the base block 58 is tightened to secure the base block to the spacer block. The mounting block 60 of each support assembly 56 is secured by a dovetail interfitting connection 72 and an adjustment screw 74 to the base block 58 so as to extend in cantilever fashion a short distance inwardly therefrom in overlying relation to a marginal edge portion of the retroreflective surface 36 of the inspection platform 34. The grid support member 62 of each support assembly 56 is slidably mounted by a dovetail groove and track connection 76 to the lower side of the mounting block 60. An adjustment screw 78 is used to move the support member 62 along the X-axis relative to the mounting block 60. At the inner end of each support member 62 is seated one of the grid support inserts 64.

When a grid 16 is supported by the fixture 14 as seen in FIG. 1, each of the support members 62 underlies the perimeter of the grid 16 and each of the inserts 64 extends from the bottom side of the grid upwardly into one of the cells thereof. In order for the field of view which encompasses the grid 16 to be transparent except for the grid itself, the grid engaging portions of the fixture 14 which project into the field of view to support the grid 16—the support members 62 and inserts 64—are made of transparent material. For example, the support members 62 are composed of acrylic material and the inserts 64 are scratch-resistant synthetic sapphire material.

Further, the universal fixture 14 includes a pair of extendable and retractable actuators 80A,80B, for example, in the form of air cylinders. One actuator 80A is mounted to the one tracks 52A on base portion 46B, whereas the other actuator 80A is mounted to a third track 52C on base portion 48A, by spacer blocks 82 and base blocks 84 being substantially identical, in construction and in their connections together and to the tracks, to the spacer blocks 54 and mounting blocks 60 of the grid supports 50A, 50B. The actuators 80 are actuatable to locate the grid 16 in a desired position with respect to the inspection field of view by causing slight movement of the grid in X and Y directions relative to the grid support members 62 and inserts 64.

Still further, the fixture 14 includes a plurality of sensors 86, for instance in the form of microswitch assemblies, mounted to the mounting blocks 60 (above the support members 62) of the first pair of grid supports 50A and to a fourth track 52D by a spacer block 88 and base block 90 being substantially identical, in construction and in their connections together and to the track, to the spacer blocks 54 and mounting blocks 60 of the grid supports 50A,50B. The sensors 86 are responsive to contact by the grid 16 when the latter has been moved to its desired position with respect to the inspection field of view.

Turning now to FIGS. 12-16, there is seen two of the many different fuel assembly grid designs adapted to be supported by the universal fixture 14 within the inspection field of view of the noncontact measurement device 12. The grids 16A,16B basically include a multiplicity of interleaved straps 92 having an egg-crate configuration designed to form cells 94. The cells 94 of the grid 16A have opposing dimples 96 formed in the metal of the interleaved straps 92 to support the fuel rods of a fuel assembly which extend through the cells 94. Also, mixing vanes 97 are defined on and extend upwardly from the straps 92. The cells 94 of the grid 16B have opposing dimples 96 and springs 98 which serve the same purpose.

In carrying out inspection of the fuel assembly grid 16, the viewing means 30 and source of illumination 32 of the DGU 18 are turned on and moved so as to define the illuminated inspection field of view across the grid as it is supported by the fixture 14. The viewing means 30 views the grid and records multiple images thereof to provide digitized video information to the MDDA 20 from which measurements can be calculated and compared to known standard measurements for the particular grid design stored in the MDDA 20. To view 100% of the grid 16, the viewing means 30 (i.e., video camera and lens system), while maintained pointed in the direction of the field of view toward the retroreflective surface 36, and/or the grid are moved relative to one another. However, the position of the fixture 14 is first sensed to ensure the correctness of the placement thereof before proceeding with inspection of the grid.

Typically, as is the case with the grids in FIGS. 12-16, the grid 16A or 16B being inspected has at least a pair of vertically displaced fuel rod contacting dimples 96 disposed in each of a plurality of cells 94 defined in the grid. The dimples 96 are inspected for perpendicularity with respect to each other by using the viewing means 30 to view them at separate instances but from the same location above them and within the field of view. A separate image of each dimple 96 is recorded to provide information from which the degree of offset of one dimple with respect to the other can be determined.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. In a fuel assembly grid inspection apparatus, the combination comprising:
   (a) a precision noncontact measurement device having illuminating means and viewing means defining an inspection field of view, said viewing means being adapted to view and record an image of a fuel assembly grid located in said field of view to provide information about the grid from which measurements can be calculated; and
   (b) a fixture adapted to support the grid within said inspection field of view and having a plurality of grid engaging portions which project into said field of view to support the grid, said portions being substantially transparent to said viewing means of said measurement device.

2. The apparatus as recited in claim 1, wherein said viewing means is a video camera and lens system.

3. The apparatus as recited in claim 1, wherein said illuminating means is a retroreflective inspection platform.

4. The apparatus as recited in claim 3, wherein said viewing means is a video camera and lens system disposed in spaced relation above said inspection platform.

5. The apparatus as recited in claim 1, wherein said fixture includes:
   a mounting base having first and second pairs of opposing portions bounding the perimeter of said inspection field of view;
   a pair of upright grid supports; and
   guide means mounted along said opposing mounting base portions of said first pair thereof, said grid supports being mounted to said guide means for adjustable slidable movement therealong, each of said grid supports having thereon one of said substantially transparent grid engaging portions which project into said field of view to support the grid.

6. The apparatus as recited in claim 5, wherein said guide means is a pair of tracks mounted at, and in parallel relation along, said opposing mounting base portions of said first pair thereof.

7. The apparatus as recited in claim 5, wherein said fixture further includes:
   a pair of extendable and retractable actuators, one being mounted on one of said opposing mounting base portions of said first pair thereof and the other being mounted on one of said opposing mounting base portions of said second pair thereof, said actuators being actuatable to locate said grid in a desired position base with respect to said inspection field of view by causing movement of said grid in X and Y directions.

8. The apparatus as recited in claim 7, wherein each of said actuators is an air cylinder.

9. The apparatus as recited in claim 5, wherein said fixture further includes:

a plurality of sensors, one being mounted on the other of said opposing mounting base portions of said first pair thereof and the other being mounted on the other of said opposing mounting base portions of said second pair thereof, said sensors being responsive to contact by the grid when the latter has been moved to its desired position with respect to said inspection field of view.

10. In a fuel assembly grid inspection apparatus, the combination comprising:
 (a) a precision noncontact measurement device having illuminating means and viewing means defining an inspection field of view, said viewing means being adapted to view and record at least one image of a fuel assembly grid located in said field of view to provide information about the grid from which measurements can be calculated; and
 (b) a universal fixture adapted to support any one of a plurality of fuel assembly grids of different designs within said inspection field of view of said noncontact measurement device, said fixture having a plurality of grid engaging portions which project into said field of view to support the grid, said portions being substantially transparent to said viewing means of said measurement device.

11. The apparatus as recited in claim 10, wherein:
 said measurement device includes a stationary base and an inspection platform movable in the Y direction with respect to said stationary base, said viewing means of said device being disposed in spaced relation above said inspection platform and movable in X and Z directions with respect to said stationary base; and
 said fixture includes a mounting base having first and second pairs of opposing portions bounding the perimeter of said inspection field of view, said mounting base being supported by said inspection platform of said measurement device.

12. The apparatus as recited in claim 11, wherein said fixture further includes:
 first and second pairs of upright grid supports; and
 guide means mounted along said opposing mounting base portions of said first pair thereto, each of said pairs of grid supports being mounted to said guide means in spaced relation to one another for adjustable slidable movement therealong, each of said grid supports having thereon one of said substantially transparent grid engaging portions which project into said field of view to support the grid.

13. The apparatus as recited in claim 11, wherein said fixture further includes:
 a pair of extendable and retractable actuators, one being mounted on one of said opposing mounting base portions of said first pair thereof and the other being mounted on one of said opposing mounting base portions of said second pair thereof, said actuators being actuatable to locate said grid in a desired position with respect to said inspection field of view by causing movement of said grid in X and Y directions.

14. The apparatus as recited in claim 13, wherein said fixture further includes:
 a plurality of sensors, one being mounted on the other of said opposing mounting base portions of said first pair thereof and the other being mounted on the other of said opposing mounting base portions of sadi second pair thereof, said sensors being responsive to contact by the grid when the latter has been moved to its desired position with respect to said inspection field of view.

* * * * *